United States Patent
Kovach et al.

(10) Patent No.: US 9,510,496 B2
(45) Date of Patent: Dec. 6, 2016

(54) TILLAGE IMPLEMENT WITH SCRAPER/DEFLECTOR

(71) Applicant: CNH Industrial America LLC, New Holland, PA (US)

(72) Inventors: Michael G. Kovach, Morton, IL (US); Rick L. Gerber, Roanoke, IL (US); Eric J. Anderson, Metamora, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/463,761

(22) Filed: Aug. 20, 2014

(65) Prior Publication Data
US 2015/0053441 A1    Feb. 26, 2015

Related U.S. Application Data

(60) Provisional application No. 61/868,285, filed on Aug. 21, 2013.

(51) Int. Cl.
*A01B 23/06* (2006.01)
*A01B 21/08* (2006.01)

(52) U.S. Cl.
CPC ............. *A01B 23/06* (2013.01); *A01B 21/083* (2013.01)

(58) Field of Classification Search
CPC ................................ A01B 23/06; A01B 15/16
See application file for complete search history.

(56) References Cited

U.S. PATENT DOCUMENTS

| | | | |
|---|---|---|---|
| 3,759,332 A | 9/1973 | Robertson, Sr. | |
| 4,127,179 A | 11/1978 | Heersink et al. | |
| 4,211,284 A | 7/1980 | Collado | |
| 4,330,041 A | 5/1982 | Ankenman | |
| 4,423,789 A | 1/1984 | Anderson et al. | |
| 4,492,272 A | 1/1985 | Jensen | |
| 4,687,065 A | 8/1987 | Cope et al. | |
| 4,724,910 A * | 2/1988 | Wheeler | 172/464 |
| 6,223,832 B1 | 5/2001 | Hook et al. | |
| 6,237,696 B1 | 5/2001 | Mayerle | |
| 6,874,584 B2 | 4/2005 | Butterfield et al. | |
| 7,290,620 B2 | 11/2007 | Cooper et al. | |
| 7,357,193 B2 | 4/2008 | Harmon et al. | |
| 7,481,279 B2 | 1/2009 | Blunier et al. | |
| 7,568,438 B2 | 8/2009 | Arksey | |

(Continued)

FOREIGN PATENT DOCUMENTS

SU    1521302 A1    11/1989

OTHER PUBLICATIONS

"Tillage Equipment", Farm King brochure, Apr. 29, 2012 (28 pages).

(Continued)

*Primary Examiner* — Matthew D Troutman
(74) *Attorney, Agent, or Firm* — Rebecca L. Henkel

(57) ABSTRACT

An agricultural tillage implement including a carriage frame assembly and pull hitch towed by a tractor and secondary frames supported by the carriage frame assembly. The secondary frames mount gangs of disk blades for tilling the soil in a travel direction. Bearing hanger assemblies support the gangs of disk blades below the secondary frames and deflector/scraper elements are mounted on the bearing hanger assemblies for scraping soil and residue from the disk blades and deflecting it away from the travel direction.

5 Claims, 4 Drawing Sheets

(56) References Cited

U.S. PATENT DOCUMENTS

| | | |
|---|---|---|
| 7,631,701 B2 | 12/2009 | Kromminga et al. |
| 7,647,982 B2 | 1/2010 | Meidinger |
| 7,721,815 B2 | 5/2010 | Hoffman et al. |
| 7,753,134 B1 | 7/2010 | Anderson et al. |
| 8,196,671 B2 | 6/2012 | Friestad |
| 2006/0225901 A1* | 10/2006 | Blunier et al. ............... 172/558 |
| 2008/0264659 A1* | 10/2008 | Hoffman et al. ............ 172/558 |
| 2009/0000796 A1 | 1/2009 | Cooper et al. |
| 2011/0108295 A1 | 5/2011 | Schilling |
| 2013/0032366 A1 | 2/2013 | Naylor et al. |

OTHER PUBLICATIONS

Russian Office Action and the translation thereof dated Jul. 1, 2015 for Russian Application No. 2014124371/13 (039681) (9 pages).

* cited by examiner

TILLAGE IMPLEMENT WITH SCRAPER/DEFLECTOR

CROSS REFERENCE TO RELATED APPLICATIONS

This is a non-provisional application based upon U.S. provisional patent application Ser. No. 61/868,285, entitled "TILLAGE IMPLEMENT WITH SCRAPER/DEFLECTOR", filed Aug. 21, 2013, which is incorporated herein by reference.

BACKGROUND OF THE INVENTION

1. Field of the Invention

The present invention relates to agricultural implements, and, more particularly, to agricultural field tillage implements.

2. Description of the Related Art

Farmers utilize a wide variety of tillage implements to prepare soil for planting. Some such implements include two or more sections coupled together to perform multiple functions as they are pulled through the fields by a tractor, for example, a cultivator/harrow which is capable of simultaneously tilling and leveling the soil in preparation for planting. This implement includes a cultivator that is towed by a tractor in a harrow that is towed by the cultivator.

In one type of tilling operation, rows or gangs of circular disk blades are pulled through the soil at variable depths to break up clods or lumps of soil, as well as old plant material to provide a more amenable soil structure for planting and to level the soil surface. The gangs of disks are arranged on frames that extend generally laterally with respect to the direction of movement through a field and more particularly are angled with respect to the direction of movement.

As tillage operations have been developed to be more efficient, the implements are being called upon to operate in evermore increasing extremes of conditions. At the same time, the tillage implements are being expanded in size to provide greater efficiency in processing the soil. Tillage implements are expected to operate in wetter conditions to minimize the effect of weather on the farming operation.

With conditions such as described above, there is a tendency for soil to accumulate on the disk blades. This is particularly a problem for the disk blades adjacent the bearing hanger that supports the gangs of disk blades for rotation and soil penetration below the implement frame. Accumulation of this type prevents smooth flow of soil and residue through the equipment. Operators then need to remove the obstructions by raising the implement out of the ground or removing the accumulated soil and residue by hand. Scrapers have been proposed but they are hung from the frame for the bearing hanger and as a result do not have a correct angle to adequately scrape and deflect the soil and residue. All these factors result in making the tillage operation less efficient and cost effective.

What is needed therefore in the art is a tilling implement that minimizes build up of soil and residue on the support for the gangs of disk blades without additional and complicated mechanisms.

SUMMARY OF THE INVENTION

The present invention provides a tillage implement with disk blades having uniform soil penetration during field operations.

In one form, the invention is an agricultural tillage implement including a carriage frame assembly with a pull hitch extending in a travel direction. Secondary frames extend generally laterally with respect to the travel direction. Gangs of disk blades are journaled by and supported by a bearing hanger mounted to the secondary frames to till soil over which the tillage implement traverses. A scraper/deflector is positioned adjacent the bearing hanger to scrape soil and residue from at least some of the disk blades and deflect it away from the travel direction.

An advantage of the present invention is that the disk blades and their support elements are kept substantially free of soil and residue.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
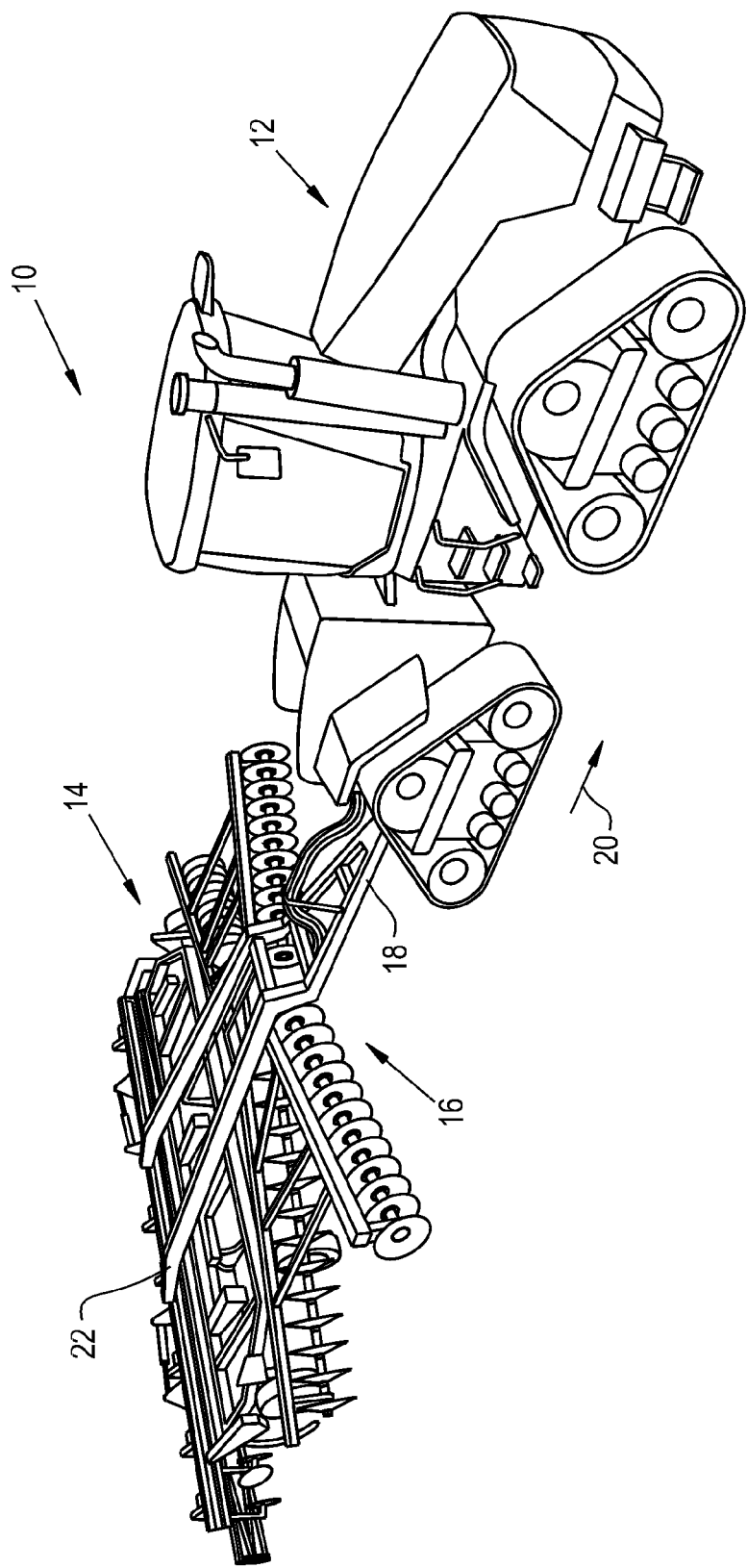
FIG. 1 illustrates a tillage implement including a support of disk blades embodying the present invention, being pulled by a tractor.

Referring now to the drawings, and more particularly to FIG. 1, there is shown a tillage apparatus 10 which generally includes a tractor 12 and an agricultural tillage implement 14 for tilling and finishing soil prior to seeding.

Figure 2:
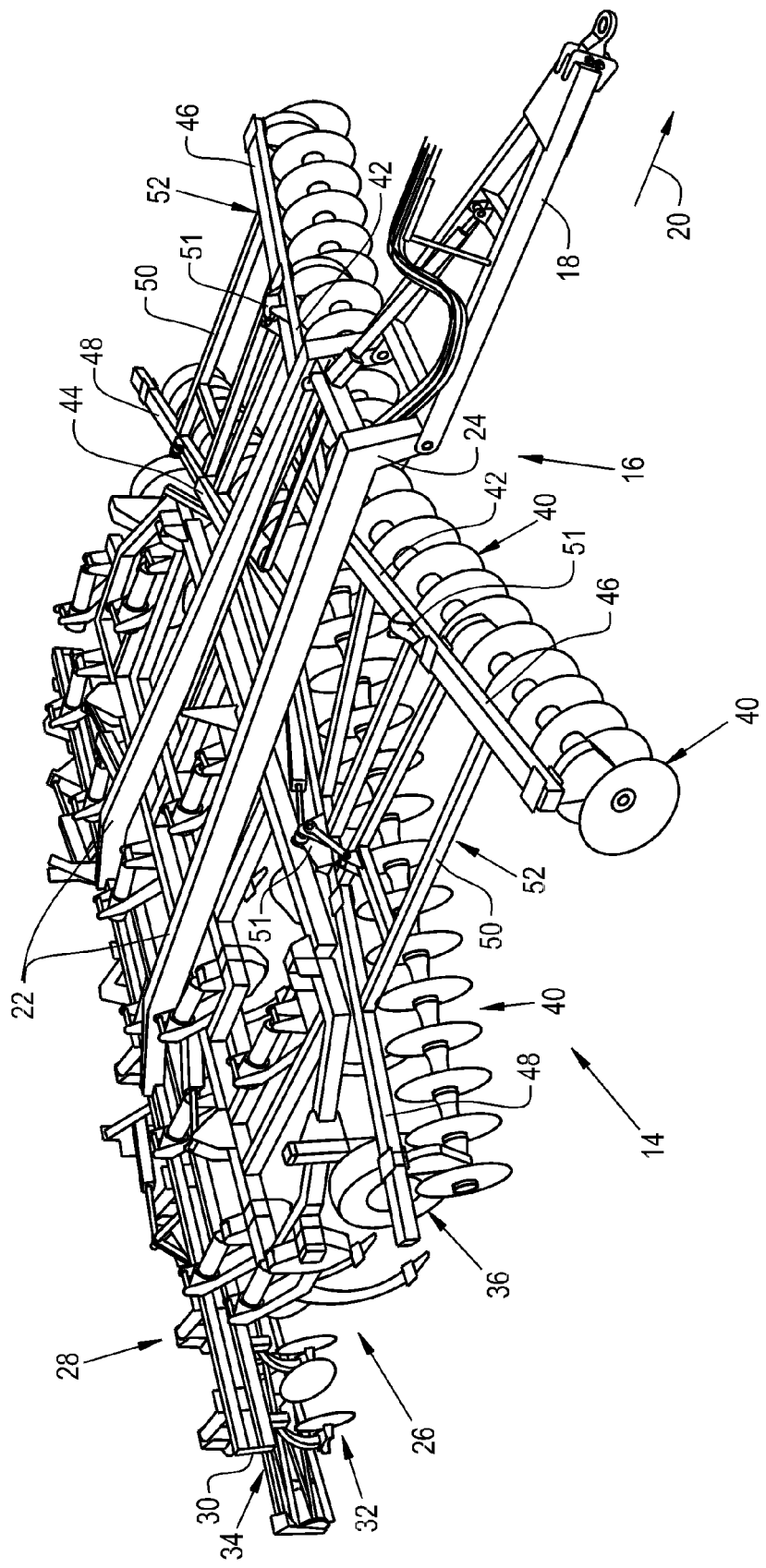
FIG. 2 is a perspective view of the tillage implement of FIG. 1.

Now, additionally referring to FIG. 2, agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft directed carrier frame members 22 which are coupled with and extend from pull hitch 18. Reinforcing gusset plates 24 may be used to strengthen the connection between pull hitch 18 and carrier frame members 22. Carriage frame assembly 16 generally functions to carry a shank frame 26 for tilling the soil, and a rear implement 28 for finishing the soil. Rear implement 28 includes a secondary frame 30, leveling blades 32 and rolling (aka, crumbler) basket assemblies 34, which co-act with each other to finish the soil in preparation for planting. Leveling blades 32 and rolling basket assemblies are both attached to secondary frame 30.

Wheels 36, only one of which is shown, are actuated from tractor 12 to raise or lower the carrier frame members 22 and 23 to place the tillage apparatus in a transport position with the wheel assemblies 36 supporting the implement above the ground and an operating position in which the tillage equipment is used to till the soil.

Figure 3:
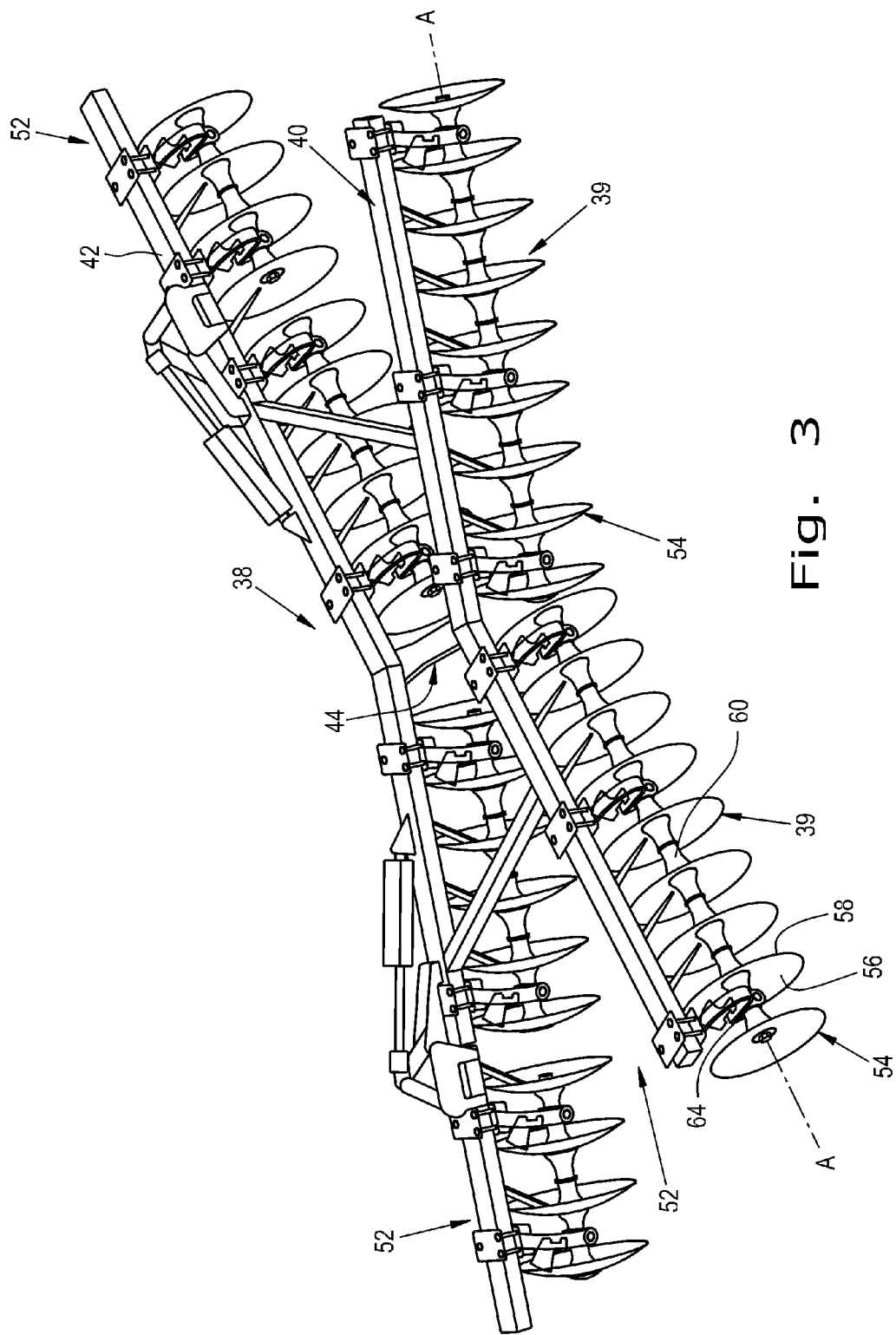
FIG. 3 is a partial perspective view of the tillage implement of FIGS. 1 and 2.

Referring now to FIG. 3, there is shown a portion of a disk frame assembly 38 which provides support for gangs of disk blades 39 shown particularly in FIG. 2. The disk frame assembly 38 includes forward and aft frame members 40 and 42, respectively. Frame members 40 and 42 are structurally interconnected by a central frame element 44 and outboard forward and aft frame members (not shown) to reinforce the frame members 40 and 42 to establish the disk frame assembly 38 in substantially a single plane when not in operation. A plurality of pivot joints 50 are positioned along outboard frame members 46 and provide pivoting support for wing sections 52, shown in particularly in FIG. 3. Wing sections 52 are pivoted between a field operating position in which they are generally horizontal with respect to the disk frame 38 and a transport position in which they are pivoted out of the plane for appropriate road clearance during the transport mode.

Figure 5:
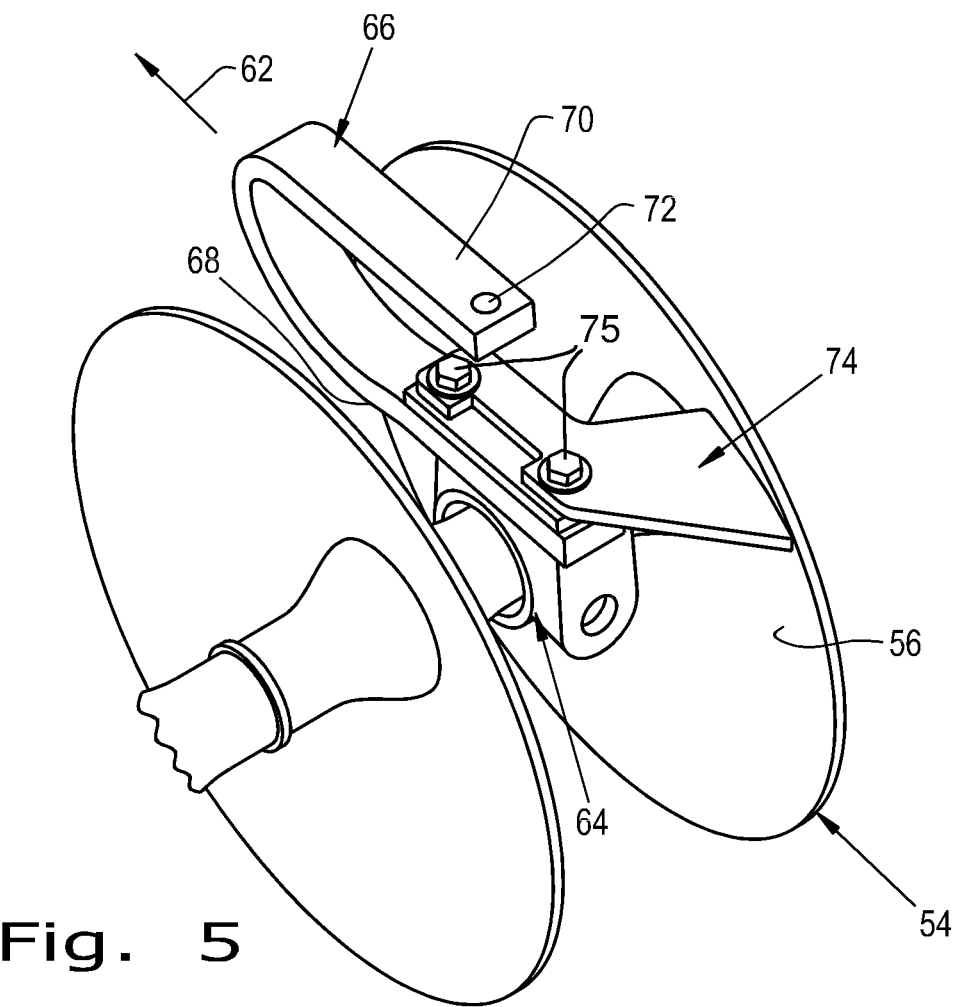
FIG. 5 is an expanded perspective view of the scraper/deflector incorporated in the tillage implement of FIGS. 1-5.

As shown particularly in FIG. 3, the gangs of disk blades 39 each have individual disk blades 55 having a concave side 56 and convex side 58. The individual disks 54 are each sandwiched between central shaft assemblies 60 to interconnect the disk blades and cause them to rotate about a common axis A. As noted particularly in FIG. 3, the gangs of disk blades 39 are at an angle with respect to the travel direction 62. This promotes a more effective tilling of the soil. At periodic intervals along the gangs of disk blades 39, there are positioned bearing hanger assemblies 64 mounted to and supported from the secondary frames 40 and 42 by C-shaped structures 66, particularly shown in FIG. 5. As shown in FIG. 5, each bearing hanger assembly 64 is mounted to a lower section 68 of C-shaped support element 66 and an integral top section 70 is fastened to the appropriate frame element 40 and 42 through a hole 72. The C-shaped elements 66 provide a degree of flexibility resiliency for the gangs of disk blades 39 to improve tillage operations. Scraper/deflector 74 is fastened to bearing hanger 64 by fasteners 75 extending through scraper/deflector 74, C-shaped element 66 and fastened to bearing hanger 64.

Figure 4:
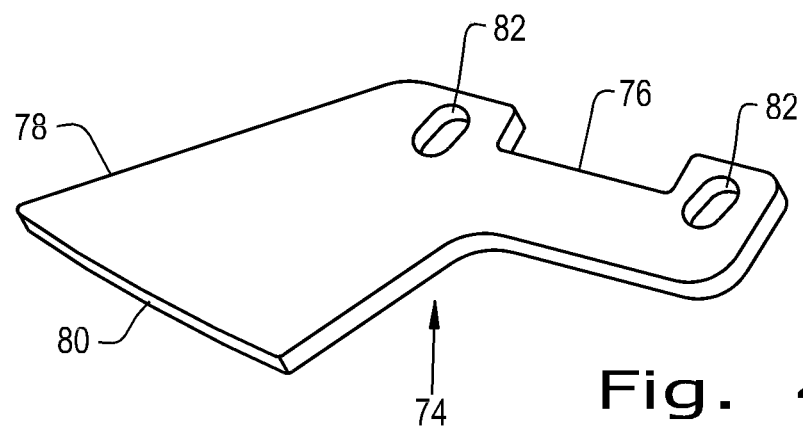
FIG. 4 is an expanded perspective view of a scraper/deflector incorporated in the tillage implement of FIGS. 1 and 2.

In accordance with the present invention, a scraper/deflector 74, shown in FIG. 4, is mounted adjacent bearing hanger assembly 64. Scraper/deflector 74 comprises a base section 76 and an outwardly extending section 78 terminating in a curved scraper edge 80 that conforms to the concave side 56 of individual disk blades 54. Scraper/deflector 74 has elongated holes 82 to provide a degree of adjustment between the curved edge 80 of the scraper/deflector 74 and the concave side 56 of disk blade 54.

As shown in FIG. 5, which is looking in the travel direction 62, the scraper/deflector 74 is downstream of the bearing hanger assembly 64 and is in a generally horizontal plane. As a result, the movement of the tillage implement 10 through the field causes the disk blades 54 to rotate in a counter clockwise direction as viewed in FIG. 5 so that the scraper/deflector 74 scrapes any accumulated soil and residue from the concave side 56 of disk 54 and deflects it away from the travel direction 64. This provides greatly improved performance by the position of the scraper/deflector 74 relative to the plane of the implement and its position aft of the bearing hanger assembly 64. The elongated holes 82 allow a significant degree of precision in adjusting the curved scraper edge 80 to be appropriately positioned relative to the concave side 56 of disk 54.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
   a carriage frame assembly including a pull hitch extending in a travel direction;
   secondary frames extending generally laterally with respect to the travel direction; and,
   gangs of disks blades connected to and supported by said secondary frames to till soil over which the tillage implement traverses;
   bearing hangers supported from the secondary frames for rotation about an axis generally lateral to the travel direction;
   at least one fastener;
   a structural element connecting the secondary frames to the bearing hangers; and
   a single piece scraper/deflector element positioned horizontally adjacent to the disk blades, said scraper/deflector element being positioned aft of the bearing hangers relative to the travel direction and fastened to the bearing hangers by said at least one fastener extending through said scraper/deflector and connected to said bearing hanger to scrape residue and deflect it away from the travel direction; and
   wherein said single piece scraper/deflector element is a flat plate that extends in a horizontal plane when fastened to the bearing hanger.

2. The agricultural tillage implement of claim 1, wherein the structural element for supporting the bearing hanger is a C-shaped element to provide a resilient mounting, said at least one fastener extending through said scraper/deflector and said C-shaped element to said bearing hanger.

3. The agricultural tillage implement of claim 1, wherein the disk blades have a concave and convex side and said scraper deflector is positioned to be adjacent the concave side of the disk.

4. The agricultural tillage implement of claim 3, wherein the scraper/deflector has a curved scraping edge for conforming to the concave side of the disk.

5. The agricultural tillage implement of claim 4, in which the scraper deflector comprises a plate-like element having elongated holes for fastening to the bearing hanger to provide adjustment relative to the concave side of the disk blades.

* * * * *